United States Patent [19]

Howey

[11] Patent Number: 5,060,105
[45] Date of Patent: Oct. 22, 1991

[54] HYBRID NONWOVEN DISKETTE LINER

[75] Inventor: Jon A. Howey, Mansfield, Mass.

[73] Assignee: International Paper Company, Purchase, N.Y.

[21] Appl. No.: 509,533

[22] Filed: Apr. 16, 1990

[51] Int. Cl.⁵ .................. G11B 23/03; B65D 85/30
[52] U.S. Cl. ................................. 360/133; 206/444
[58] Field of Search ............... 360/133, 137; 206/444

[56] References Cited

U.S. PATENT DOCUMENTS

| | | | |
|---|---|---|---|
| 3,655,348 | 4/1987 | Takagi | 360/133 |
| 3,791,516 | 12/1988 | Seto | 360/133 |
| 4,106,067 | 8/1978 | Masuyama et al. | 360/137 |
| 4,223,361 | 9/1980 | Zaitsu et al. | 360/133 |
| 4,251,843 | 2/1981 | Masuyama | 360/137 |
| 4,354,213 | 10/1982 | Martinelli | 360/133 |
| 4,414,597 | 11/1983 | Cornin | 360/133 |
| 4,419,164 | 12/1983 | Martinelli | 360/133 |
| 4,586,606 | 5/1986 | Howey | 206/313 |
| 4,610,352 | 9/1986 | Howey | 206/313 |
| 4,680,661 | 7/1987 | Oishi | 360/133 |
| 4,803,584 | 2/1989 | Doi et al. | 360/133 |
| 4,845,583 | 7/1989 | Zimmerman | 360/133 |

Primary Examiner—A. J. Heinz
Assistant Examiner—Jefferson Evans
Attorney, Agent, or Firm—Walt Thomas Zielinski

[57] ABSTRACT

A hybrid nonwoven liner for a diskete holder is bonded and impregnated with a small amount of binder which is uniformly distributed throughout the fabric and comprises no more than 5% by weight and preferably between 1.5-3.0% by weight of the fabric. The low concentration of binder ensures that the liner surface does not become totally coated with plastic film that reduces cleaning ability, while also providing a high increase in tensile strength and a significant debris reduction. The binder solution preferably has a high surface tension (low surfactant level), so that the binder beads and becomes dried at junction points of the fibers and evenly distributed throughout the fabric. The low level of surfactant ensures a low risk of chemical attack of the disk media surface.

24 Claims, 3 Drawing Sheets

HYBRID NONWOVEN DISKETTE LINER

Field of Invention

This invention generally relates to a nonwoven liner for use in a diskette cartridge.

BACKGROUND ART

Disks are presently employed to store information in digital form on the surface of a recording medium layer formed on the disk. The information can be recorded on (written to) or read from the recording surface by magnetic, magneto-optic or optic systems. In a typical system it is intended that the information stored on these disks be retrieved and loaded into a computer system quickly and easily without error. It has been found that magnetic particles as well as seemingly innocuous things such as fingerprints, dust particles or smoke particles can contaminate a disk and cause a read/write head to bounce over the contamination and disrupt the flow of information. This misreading of information is often referred to as "dropout" and is one of the most serious problems encountered in transferring information between a disk drive and a computer.

To overcome the dropout problem, disk cartridges are designed to provide a substantially closed and dust free environment for the disk. However, contaminants can infiltrate the disk through the hub or read/write window of the cartridges. Thus it is desirable to include a liner within the cartridge placed in contact with the disk to remove wear particles from the magnetic surface as well as other contaminants from the surface of the disk.

It is known to form a diskette liner from nonwoven fibers bonded together with an adhesive binder. Examples of such adhesive-bond liners can be found in U.S. Pat. Nos. 4,251,843 to Masuyama, and 4,354,213 and 4,419,164 to Martinelli which typically contain between twenty (20) and fifty (50) percent by weight of binder to achieve a bonding strength sufficient to maintain fabric integrity. The high amount of binder in adhesive-bond liners tends to coat the fibers with a plastic film, which results in a low cleaning ability. It also requires that binders of low glass transition temperature be used, in order to avoid excessive stiffness, but the tradeoff is reduced durability. It also requires conditioning chemicals, such as additional surfactants, anti-foams, and cross-linkers, to stabilize the binder solution, which presents a greater risk that such chemicals will be degraded (formaldehyde from cross-liners) or transported (surfactants and anti-foams made mobile by humidity) onto the disk media where they can cause damage or reduced durability.

Thermal-bond fabrics are also used for diskette liners, but they generally have a lower strength and stiffness and a higher level of debris. Also, significant amounts of free fiber pieces and other debris can come from the areas of the liner fabric that are cut during diskette manufacturing. U.S. Pat. Nos. 4,223,361 to Zaitsu, 4,414,597 to Cornin, 4,586,606 and 4,610,352 to Howey, 4,655,348 to Takagi, 4,680,661 to Oishi, and 4,803,584 to Doi show various improvements for reducing debris from and/or strengthening of thermal-bond liners by additional thermal bonding in or around the liner or through the use of stiffener layers or anti-dust layers or materials. The additional layers, dust prevention, and strengthening procedures tend to make the manufacturing process more costly and complicated.

U.S. Pat. No. 4,845,583 to Zimmerman discloses a powder-bonded nonwoven liner fabric which increases the strength and reduces the probability of debris from cut areas during diskette manufacturing. The powder is a thermoplastic adhesive material that is evenly deposited on a fiber web in an amount of approximately ten (10) to twenty (20) percent of the total fabric weight. Upon heating, the powder fuses and bonds the fibers of the web. The powder-bond fabric is deemed to have smaller and more widely distributed bond areas and a higher frequency of bond sites as compared with a thermal-bond fabric.

U.S. Pat. No. 4,791,516 to Seto discloses a treatment of a thermal-bond liner fabric with binder solution so that a higher concentration of the binder of about fifty (50) percent by weight of fabric is provided on the media-contacting side, and a lesser concentration of about five (5) percent is provided through the interior of the liner to the side adjacent the holder wall. Although it provides stiffness and reduced fibrous debris, the high level of binder at the media-contacting side tends to form a plastic coating that reduce cleaning ability.

SUMMARY OF THE INVENTION

A principal purpose of the present invention is to provide a liner for a diskette holder which has the requisite strength and stiffness without reducing cleaning ability or requiring additional or complicated manufacturing steps. Given the intimate contact between the disk and the liner, it is also desirable for the liner to be as free of debris and chemicals as possible to avoid contributing to dropout by contaminants on the disk surface.

In accordance with the present invention, a hybrid nonwoven diskette liner is comprised of a nonwoven fabric made of fibers which are bonded together and impregnated with a small amount of binder that is substantially uniformly distributed throughout the fabric in a low concentration that comprises no more than five (5) percent by weight and preferably between 1.5-3.0% by weight of the fabric. The low concentration of binder ensures that the liner surface does not become coated with a plastic film that reduces cleaning ability. At the same time, the low amount of binder is found to provide a disproportionately high increase in tensile strength and a significant reduction in debris from the liner during diskette manufacturing.

The invention also encompasses the method of fabricating a low debris nonwoven diskette liner fabric by bonding a web of nonwoven fibers, applying a binder solution to the bonded fabric having a high surface tension and a low concentration of binder, such that the binder does not constitute more than 5% by weight of the finished fabric, allowing the binder to bead on and be retained at the junction points of the fibers, then drying the binder-impregnated fabric.

Through the high surface tension (low surfactant) and low concentration in solution, the binder beads and becomes dried at junction points of the fibers and is evenly distributed throughout the fabric. The low level of surfactant and binder ensures a corresponding low level of associated chemicals to reduce the risk of chemical attack of the disk media surface.

Other objects, features and advantages of the present invention will become apparent from the following detailed description of the preferred modes and embodiments of the invention considered in conjunction with the drawings, which should be construed in an illustrative and not limiting sense, as follows:

DETAILED DESCRIPTION OF THE INVENTION

Figure 1:
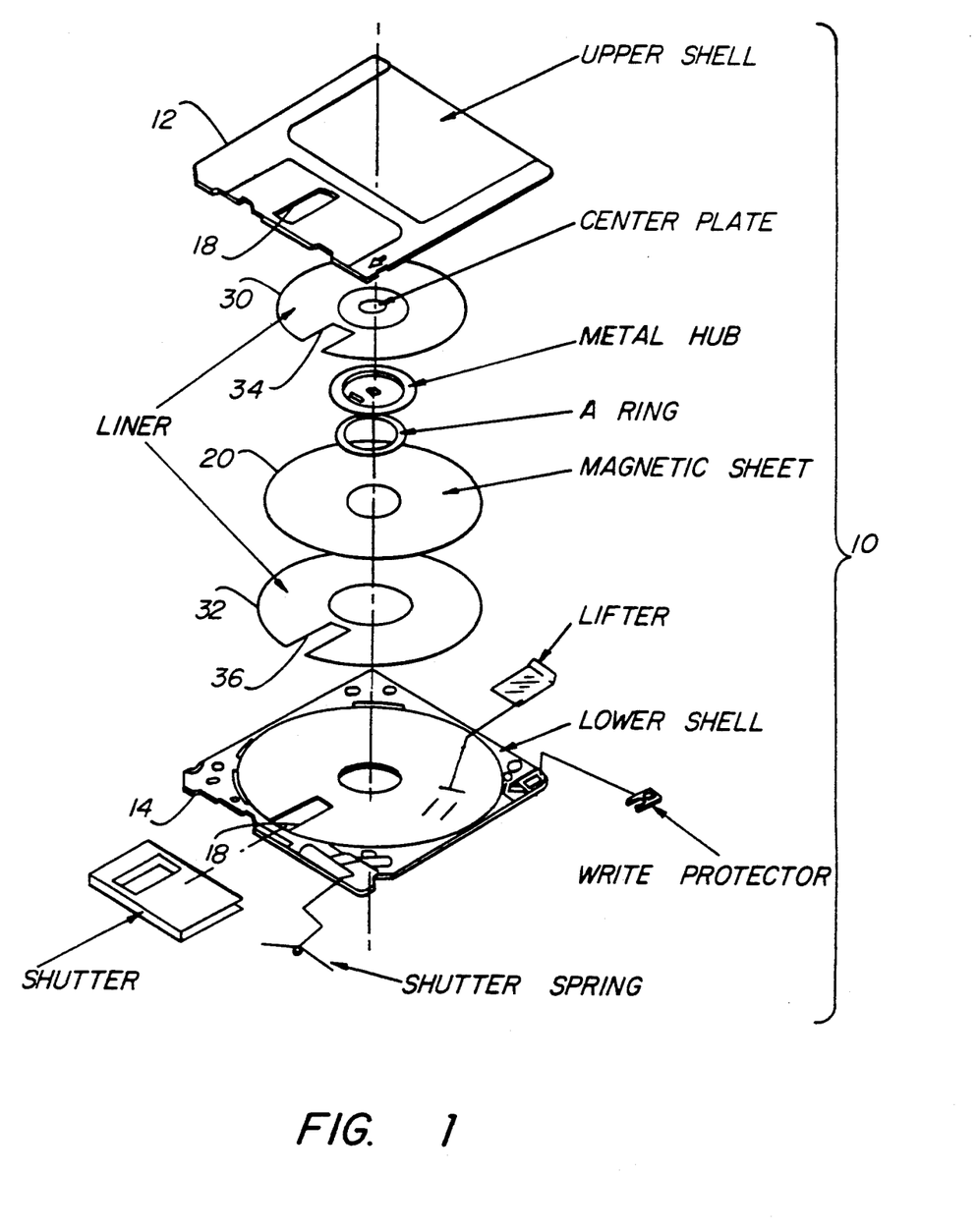
FIG. 1 is an exploded perspective view of a typical disk cartridge employing the hybrid nonwoven diskette liner of the present invention.

With reference to the drawings and more particularly to FIG. 1 thereof, a diskette cartridge 10 has an upper member 12 and a lower member 14. The disk 20 can be rotated by a mechanism which can for instance include a rim drive apparatus which drives a disk rim to rotate the disk 20. Alternatively, the disk 20 can include a hub for engaging a suitable hub drive mechanism disposed within the disk drive apparatus. One or both of the upper and lower members 12 and 14 of the disk cartridge 10 includes a cutout 18 for providing a read/write head access to the disk 20.

Liners 30 and 32 are provided on one or both sides between the disk 20 and the upper and lower members 12 and 14 of the holder 10. The liners 30 and 32 may be formed at least substantially coextensive with the recording surface of the disk 20 and with cutouts 34 and 36 similar to the cutouts 18 in the upper and lower members 12 and 14, respectively, for mating with the holder cutouts 18 and allowing for read/write head access therethrough. The liners 30 and 32 are fixed with respect to the cartridge 10 to avoid the possibility that it might become displaced and inadvertently cover the read/write head access through cutouts 18. The liners 30 and 32 are secured to the upper and lower members 12 and 14 in alignment with the cutouts 18, for instance, by employing thermal spot welding techniques.

Figure 2:
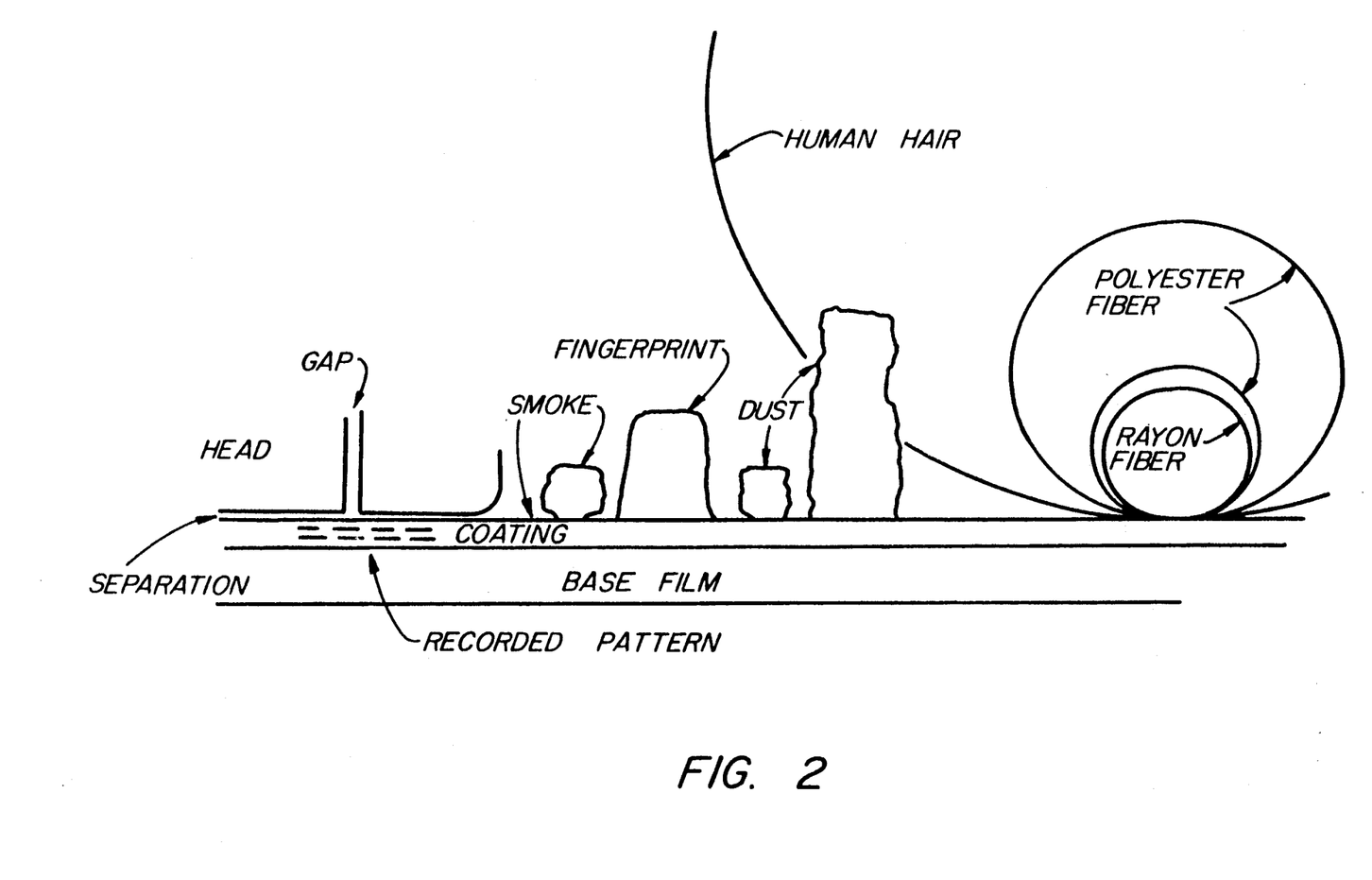
FIG. 2 is a diagram of the problem of contaminants on a disk media surface relative to a typical read/write head.

As illustrated in FIG. 2, fingerprints, smoke particles and debris or dust particles can potentially disrupt the close contact of a read/write head giving rise to data dropout. The liners 30 and 32 are therefore used to clean the contaminants and other particles from the recording media surface of the disk. According to the invention, it is particularly desired that the liner fabric have suitable strength and durability, yet have media-contacting cleaning surface with high fiber surface area and a low amount of debris from broken or cut fibers.

Figure 3:
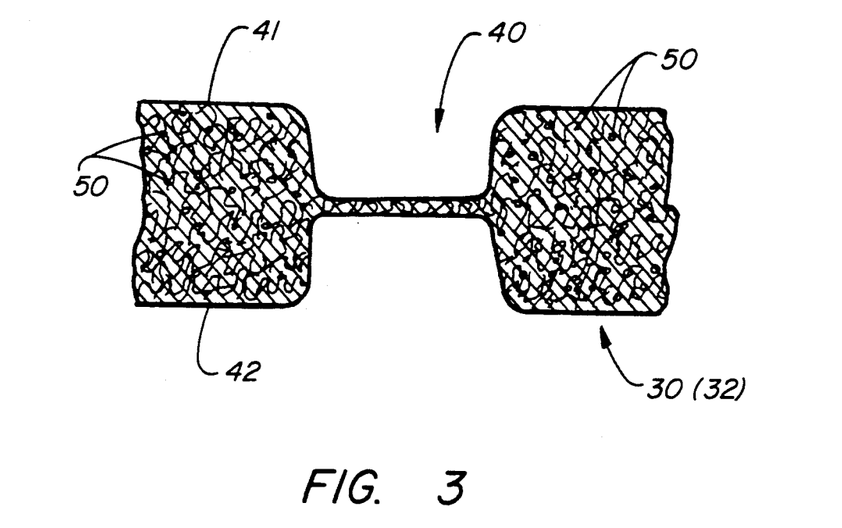
FIG. 3 is a cross-sectional diagram of a hybrid nonwoven diskette liner in accordance with the present invention having a substantially uniform distribution of a small amount of binder throughout the liner fabric.

Referring to FIG. 3, the diskette liner 30 (32) is comprised of a web of nonwoven synthetic fibers which are thermally spot welded at the thermal bond points 40 to form the basic liner fabric. In accordance with the invention, a small amount of binder (compared to the weight of the fabric) is uniformly distributed throughout the fabric and is principally applied at the junction points of the fibers, indicated at 50. The binder comprises up to about 5%, and preferably between 1.5–3.0%, by weight of the fabric. Suitable binders include styrene butadiene rubber (SBR), nitrile butadiene rubber (NBR), ethylene vinyl acetate (EVA), ethylene vinyl chloride (EVCL), polyvinyl chloride (PVC), acrylic and acrylic copolymers, polyvinyl acetate (PVA), polyvinyl alcohol, polyester (PET) and copolymers, elastomeric adhesives, and similar materials. The liner fabric may be formed from polypropylene, polyester, nylon, acrylic, cellulose acetate, rayon, cotton, wool, or bicomponent fibers or combinations thereof, or other synthetic or natural fibers.

The small amount of binder used in the invention reinforces the thermal-bond fabric at the fiber junction points without totally coating the fibers or forming a plastic film at the surfaces 41 and 42 of the fabric. Thus, the fabric maintains a high cleaning ability at the media-contacting surface. The invention seeks to avoid a high concentration of binder at the media-contacting side which would result in low cleaning ability and excessive stiffness. Debris that is normally generated from broken fibers around and between the thermal bond points 40, or from cut areas of the fabric, is reduced because any broken or cut fiber pieces are held by the binder in the fabric web. Since the binder is evenly distributed throughout the liner, either side of the liner fabric may be used interchangeably for cleaning the disk media surface, thereby facilitating the diskette manufacturing process.

Table 1 below illustrates comparatively the physical properties of one example of a nonwoven liner having no binder treatment versus treatment with different levels and types of binder. The control material is a thermally bonded nonwoven made from 50% rayon fibers and 50% polyester fibers.

TABLE 1

| PHYSICAL PROPERTIES OF HYBRID NONWOVEN LINER | | | | | |
|---|---|---|---|---|---|
| | Control | 1.5% SBR | 2% PET | 2% PVA | 3% SBR |
| WEIGHT: | | | | | |
| (Gm/sq.yd) | 29 | 32 | 31.8 | 30.2 | 31.4 |
| % Change* | — | 10% | 10% | 4% | 8% |
| TENSILE STRENGTH: | | | | | |
| MD (lb/in) | 2.9 | 4.0 | 5.7 | 6.5 | 6.0 |
| % Change | — | 38% | 97% | 124% | 107% |
| CD (lb/in) | 0.4 | 0.6 | 0.8 | 0.9 | 1.0 |
| % Change | — | 50% | 100% | 135% | 150% |
| FLEX. RIGIDITY: | | | | | |
| (Mg-cm) | 54 | 136 | 236 | 248 | 207 |
| % Change | — | 152% | 336% | 358% | 283% |
| DEBRIS: | | | | | |
| (%) By Weight | 0.062 | 0.042 | 0.037 | 0.028 | 0.029 |
| % Change | — | −32% | −40% | −55% | −53% |

*Note: Some of the increase in density is due to fabric shrinkage when exposed to heat during the binder drying and curing process.

when exposed to heat during the binder drying and curing process.

It is to be noted that significant and unexpected gains in strength, flexural rigidity (dimensional stability and stiffness for handling in manufacture), and debris reduction were obtained out of proportion to the small amount of binder used. For example, a 2% by weight addition of polyester binder produced roughly a 100% increase in machine-direction (MD) and cross-direction (CD) tensile strength, over 300% increase in flexural rigidity of the fabric, and a 40% reduction in debris from the fabric. A 1.5% addition of SBR binder produced a 50% increase in strength, a 150% increase in flexural rigidity, and a 30% debris reduction, while 3%

SBR binder produced a 150% increase in strength, 300% increase in flexural rigidity, and a 50% debris reduction.

Table 2 illustrates comparatively the physical properties of another example of a nonwoven liner having no binder treatment versus treatment with different levels of the same SBR binder. The control material is a thermally bonded nonwoven made from 75% rayon fibers and 25% polypropylene fibers.

TABLE 2

| PHYSICAL PROPERTIES OF HYBRID NONWOVEN LINER | | | | | |
|---|---|---|---|---|---|
| | Control | 0.5% SBR | 1.5% SBR | 3% SBR | 5% SBR |
| WEIGHT: | | | | | |
| (Gm/sq.yd) | 30 | 30 | 30 | 31 | 31.5 |
| % Change* | — | — | — | 3% | 5% |
| TENSILE STRENGTH: | | | | | |
| MD (lb/in) | 3.0 | 4.3 | 5.3 | 9.2 | 9.6 |
| % Change | — | 43% | 77% | 207% | 220% |
| CD (lb/in) | 0.5 | 0.6 | 0.8 | 1.4 | 1.9 |
| % Change | — | 20% | 60% | 180% | 280% |
| FLEX. RIGIDITY: | | | | | |
| (Mg-cm) | 60 | 300 | 400 | 800 | 950 |
| % Change | — | 400% | 567% | 1233% | 1483% |
| DEBRIS: | | | | | |
| (%) By Weight | 0.34 | 0.067 | 0.039 | 0.036 | 0.026 |
| % Change | — | −80% | −88% | −89% | −92% |

Again, as shown in the examples of Table 2, significant and unexpected gains in strength, flexural rigidity, and debris reduction were obtained out of proportion to the small amount of binder used.

Table 3 illustrates another example of a nonwoven liner having no binder treatment versus treatment with an SBR binder. The control material is a water-jet-entangled (hydroentangled) nonwoven made from 50% rayon fibers and 50% polyester fibers.

TABLE 3

| PHYSICAL PROPERTIES OF HYBRID NONWOVEN LINER | | |
|---|---|---|
| | Control | 1.5% SBR |
| WEIGHT: | | |
| (Gm/sq.yd) | 30 | 30 |
| % Change* | — | — |
| TENSILE STRENGTH: | | |
| MD (lb/in) | 7.3 | 8.4 |
| % Change | — | 15% |
| CD (lb/in) | 1.16 | 1.46 |
| % Change | — | 26% |
| FLEX. RIGIDITY: | | |
| (Mg-cm) | 39 | 127 |
| % Change | — | 226% |
| DEBRIS: | | |
| (%) By Weight | 0.066 | 0.037 |
| % Change | — | −44% |
| DIMENSIONAL STABILITY (force required to elongate by 1%) | | |
| MD (lbs) | 0.20 | 0.85 |
| % Change | — | 325% |
| CD (lbs) | 0.09 | 0.39 |
| % Change | — | 333% |

Again, in the examples of Table 3, significant and unexpected gains in strength, flexural rigidity, and debris reduction were obtained out of proportion to the small amount of binder used. Tests for dimensional stability of the resulting liner also showed a tripling of this property for the test fabric. In the past, hydroentangled nonwovens were not considered suitable for use as diskette liners due to their low dimensional stability which made them very difficult to cut and handle on assembly equipment. However, with the treatment of low levels of binder, as shown above, the dimensional stability of the hydroentangled fabric is increased dramatically so that it can now be used in the diskette application.

Figure 4:
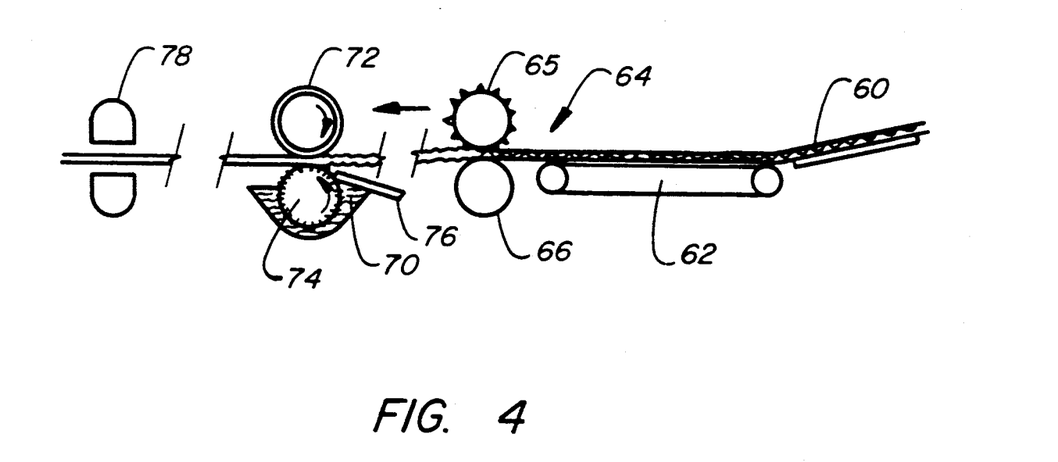
FIG. 4 is an illustration of a method for producing a hybrid nonwoven liner in accordance with the present invention.

Referring now to FIG. 4, an illustration of a method and arrangement for producing the hybrid nonwoven liner of the present invention is shown. Initially, a fibrous web 60 comprising a loose matrix of fibers is formed by carding, air laying or the like. Besides cellulosic fibers, the matrix can be comprised of conventional or textile grade staple length synthetic fibers. The fibers typically have a denier in the range of 0.5–6 and a length of a half inch to several inches.

A mixture of more than one type of fiber can be used, and the relative proportion of the fibers is not of critical significance. For example, low melting point polyester fibers can be mixed with other fibers in sufficient proportion to allow fabric formation through thermal bonding. The weight and density of the fibrous web is also not of critical importance. Web weights in the range of 15–90 grams per square yard may be used.

The web 60 of loose fibers is transported on an endless belt 62 to a heated embossing calendar 64. The calendar may be similar to the one described in U.S. Pat. No. 3,542,634 of J. J. Such, which is incorporated herein by reference. Alternatively, as shown in FIG. 4, the calendar 64 may be comprised of counter rotating rollers 65 and 66 one of which is smooth and the other of which contains a pattern of raised embossed points on the surface. The embossed points are spaced apart in both the machine and the cross direction a typical distance of less than about ½, and preferably less than ¼. The use of embossing rollers to bond nonwoven fabrics containing fusible fibers is known in the art. The embossing rollers are heated to a temperature sufficient to form fused points on the web (thermal bond points 40 in FIG. 3). The process parameters, such as temperature, use of preheaters, web speed through the embossing calendar, and other factors, are generally known to those skilled in the art. Nonwoven bonding may be accomplished by well-known thermal bonding or other techniques such as water jet entanglement, hot air, or ultrasonic bonding.

After nonwoven bonding, the web is cooled down and a binder solution 70 is applied by passing the thermally bonded fabric between an elastomer roller 72 and an etched steel roller 74 half immersed in the binder solution. The steel roller 74 transports the binder solution to the fabric while the elastomer roller 72 squeezes the solution with an even pressure throughout the fabric thickness. A doctor blade 76 removes excess solution. The wet pickup is about 100% by weight. The water is then dried off at a drying station 78. The binder may be applied to the fabric by other techniques such as spraying. During the fabrication process, the fabric can be cleaned in an ultrasonic water bath, after the nonwoven bonding step and before the addition of the binder, in order to remove fibrous debris and small particulate contaminants. A high surface tension in the binder solution is desirable to allow the binder solution to bead on the fiber during drying-off and collect at the junction points of the fiber. This technique of concentrating the binder at the junction points of the fiber by surface tension beading is ideal from a structural engineering perspective because it makes the most efficient use of the binder. This results in higher tensile strengths and lower debris. The data in Table 4 demonstrates this by comparing the physical properties of a 75% rayon and 25% polypropylene thermally bonded nonwoven that was surface treated with a binder solution made with low surface tension (by adding a surfactant) versus one made with high surface tension.

TABLE 4

PHYSICAL PROPERTIES OF HYBRID NONWOVEN LINER

|  | Control | 1.5% SBR | 1.5% SBR, 1% Surfactant |
|---|---|---|---|
| SURFACE TENSION (dynes/cm) | — | 67 | 38 |
| TENSILE STRENGTH: | | | |
| MD (lb/in) | 3.0 | 6.0 | 4.3 |
| % Change | — | 100% | 43% |
| DEBRIS: | | | |
| (%) By Weight | 0.34 | 0.030 | 0.111 |
| % Change | — | −91% | −67% |

The surface tension of the binder solution in the above example was measured with a 6 cm film-forming ring. The latex binder used was a styrene butadiene rubber polymer sold under the name GenFlo 3003, manufactured by GenCorp Polymer Products of Mogadore, Ohio. The surfactant used was Triton X100 manufactured by the Rohm and Haas Company of Edison, N.J.

As shown in the above examples, the strength and debris reduction were significantly improved using the high surface tension binder solution as compared to the low surface tension solution having the same level of binder. For example, the tensile strength was increased 100% with the high surface tension solution as compared to 43% with the low surface tension solution. Also, the debris was reduced by 91% versus 67%. Since a high surface tension solution is preferred, only a low level of surfactant or no surfactant at all need be employed in the binder solution. The absence of high levels of surfactant reduces the risk of chemical attack from the liner on the disk media. Also, since only a small amount of binder is present in the fabric, binders of high glass transition temperature may be used, thereby providing greater durability.

The invention is thus believed to obtain a synergistic effect wherein a relatively small amount of binder evenly distributed in the liner fabric provides a large increase in strength and stiffness (for handleability) and a large reduction in debris from the liner. The technique of using low-surfactant binder solution having a high surface tension allows the binder to bead to the fiber crossover points where they will have the greatest effect. For thermally bonded fabric, it is believed that the binder particularly reinforces the fabric at fiber crossover points between the areas of the thermal bonds. The invention also allows hydroentangled fabric to obtain an increase dimensional stability and flexural rigidity so that it can be used for liner applications.

Although the invention has been described with reference to certain modes and preferred embodiments, it will be appreciated that many variations and modifications may be made based upon an understanding of the disclosed principles of the invention. All such modes, embodiments, variations, and modifications are nevertheless intended to be within the scope of the invention as defined in the following claims.

I claim:

1. A hybrid nonwoven diskette liner for use in cleaning the surface of a disk recording medium, comprising a nonwoven fabric of fibers which are bonded together and impregnated with a small amount of binder that is applied as a solution to the fabric and has its fluid content removed by drying such that the binder is collected at junction points of the fibers and is substantially uniformly distributed throughout the fibers of the fabric, said fabric having a concentration of binder uniformly distributed therein of no more than 5%, and preferably between 1.5–3.0%, by weight of the fabric.

2. The hybrid nonwoven diskette liner of claim 1, wherein said binder is a polymeric film former.

3. The hybrid nonwoven diskette liner of claim 1, wherein said binder is selected from the group consisting of styrene butadiene rubber (SBR), nitrile butadiene rubber (NBR), ethylene vinyl acetate (EVA), ethylene vinyl chloride (EVCL), polyvinyl chloride (PVC), acrylic and acrylic coploymers, polyvinyl acetate (PVA), polyvinyl alcohol, polyester (PET) and copolymers, elastomeric adhesives, and similar materials.

4. The hybrid nonwoven diskette liner of claim 1, wherein said fibers are staple length fibers of one or more of the group consisting of polypropylene, polyester, nylon, acrylic, cellulose acetate, rayon, cotton, wool, or bicomponent fibers or combinations thereof, or other synthetic or natural fibers.

5. The hybrid nonwoven diskette liner of claim 1, wherein said binder is applied in the range of 1.5%–3.0% by weight of fabric, and said fabric has a tensile strength of about 20–280% greater than the nonwoven fabric without the binder.

6. The hybrid nonwoven diskette liner of claim 1, wherein said binder is applied in the range of 1.5%–3.0% by weight of fabric, and said fabric has a flexural rigidity of about 150–1500% greater than the nonwoven fabric without the binder.

7. The hybrid nonwoven diskette liner of claim 1, wherein said binder is applied in the range of 1.5%–3.0% by weight of fabric, and said fabric has a reduction of debris from said fabric of about 30–95% less than the nonwoven fabric without the binder.

8. The hybrid nonwoven diskette liner of claim 1, wherein said fabric is one selected from the group consisting of a thermally bonded fabric, a hydroentangled fabric, a hot-air bonded fabric, and an ultrasonically bonded fabric.

9. A method of fabricating a hybrid nonwoven liner material for use in cleaning the surface of a disk recording medium, comprising the steps of:

forming a web of loose fibers;

bonding the fibers in a web to form a nonwoven fabric;

applying a binder solution to the bonded fabric having a high surface tension and a low concentration of binder, such that the binder when dried does not constitute more than 5% by weight of the finished fabric;

allowing the binder solution, due to its high surface tension, to bead on and be retained at the junction points of the fibers; and drying the fluid content from the binder solution such that the binder becomes collected at the junction points of the fibers and is substantially uniformly distributed throughout the fibers of the fabric, such that said fabric has a concentration of binder uniformly distributed therein, including at a side thereof to be placed in contact with the disk recording medium, of no more than 5% of the weight of the binder-impregnated fabric.

10. The method of claim 9, wherein said binder is selected from the group consisting of styrene butadiene rubber (SBR), nitrile butadiene rubber (NBR), ethylene vinyl acetate (EVA), ethylene vinyl chloride (EVCL), polyvinyl chloride (PVC), acrylic and acrylic copolymers, polyvinyl acetate (PVA), polyvinyl alcohol, polyester (PET) and copolymers, elastomeric adhesives, and similar materials.

11. The method of claim 9, wherein said fibers are staple length fibers of one or more of the group consisting of polypropylene, polyester, nylon, acrylic, cellulose acetate, rayon, cotton, wool, or bicomponent fibers or combinations thereof, or other synthetic or natural fibers.

12. The method of claim 9, wherein said binder solution is applied in a low concentration such that the binder constitutes between 1.5-3.0% by weight of the finished fabric.

13. The method of claim 9, wherein the binder solution is applied by passing the bonded fabric between an elastomer roller and an etched metal roller partially immersed in the binder solution, such that the metal roller applies the binder solution to the fabric while the elastomer roller squeezes the solution with an even pressure to evenly distribute the binder solution throughout the fabric thickness.

14. The method of claim 9, wherein the fibers are thermally bonded by passing the nonwoven web between heated embossed rollers.

15. The method of claim 9, wherein said binder solution comprises a low level of surfactant or no surfactant.

16. The method of claim 9, wherein said binder is selected to have a high glass transistion temperature.

17. The method of fabricating a hybrid nonwoven liner material of claim 9, wherein said fabric is one selected from the group consisting of a thermally bonded fabric, a hydroentangled fabric, a hot-air bonded fabric, and an ultrasonically bonded fabric.

18. An improved diskette cartridge of the type having opposing outer wall members, a rotatable disk recording medium having at least one surface for recording information thereon retained between said outer wall members, and at least one liner placed between one of said wall members in contact with said recording medium for cleaning thereof, wherein the improvement comprises said liner being formed of a nonwoven fabric of fibers which are bonded together and impregnated with a small amount of binder that is applied as a solution to the fabric and has its fluid content removed by drying such that the binder is collected at junction points of the fibers and is substantially uniformly distributed throughout the fibers of the fabric, said fabric thereby having a concentration of binder uniformly distributed therein of no more than 5%, and preferably between 1.5-3.0%, by weight of the fabric.

19. The diskette cartridge of claim 18, wherein said binder is selected from the group consisting of styrene butadiene rubber (SBR), nitrile butadiene rubber (NBR), ethylene vinyl acetate (EVA), ethylene vinyl chloride (EVCL), polyvinyl chloride (PVC), acrylic and acrylic copolymers, polyvinyl acetate (PVA), polyvinyl alcohol, polyester (PET) and copolymers, elastomeric adhesives, and similar materials.

20. The diskette cartridge of claim 18, wherein said fibers are staple length fibers of one or more of the group consisting of polypropylene, polyester, nylon, acrylic, cellulose acetate, rayon, cotton, wool, or bicomponent fibers or combinations thereof, or other synthetic or natural fibers.

21. The diskette cartridge of claim 18, wherein said binder is in the range of 1.5%-3.0% by weight of the fabric, and said fabric has a tensile strength of about 20-280% greater than the nonwoven fabric without the binder.

22. The diskette cartridge of claim 18, wherein said binder is in the range of 1.5%-3.0% by weight of fabric, and said fabric has a flexural rigidity of about 150-1500% greater than the nonwoven fabric without the binder.

23. The diskette cartridge of claim 18, wherein said binder is in the range of 1.5%-3.0% by weight of fabric, and said fabric has a reduction of debris from said fabric of about 30-95% less than the nonwoven fabric without the binder.

24. The diskette cartridge of claim 1, wherein said fabric is one selected from the group consisting of a thermally bonded fabric, a hydroentangled fabric, a hot-air bonded fabric, and an ultrasonically bonded fabric.

* * * * *

REEXAMINATION CERTIFICATE (3070th)
United States Patent
Howey

[11] B1 5,060,105
[45] Certificate Issued Dec. 3, 1996

[54] HYBRID NONWOVEN DISKETTE LINER

[75] Inventor: Jon A. Howey, Mansfield, Mass.

[73] Assignee: International Paper Company, Purchase, N.Y.

Reexamination Request:
No. 90/004,022, Oct. 27, 1995

Reexamination Certificate for:
Patent No.: 5,060,105
Issued: Oct. 22, 1991
Appl. No.: 509,533
Filed: Apr. 16, 1990

[51] Int. Cl.⁶ ............ G11B 23/03; D04H 1/46; B32B 3/10
[52] U.S. Cl. ............ 360/133; 28/104; 428/224; 428/288
[58] Field of Search ............ 360/133; 28/104; 428/224, 288, 290

[56] References Cited

U.S. PATENT DOCUMENTS

| | | | |
|---|---|---|---|
| 3,969,295 | 7/1976 | Sunden et al. | 523/204 |
| 4,392,903 | 7/1983 | Endo et al. | 156/167 |
| 4,891,262 | 1/1990 | Nakamae et al. | 428/224 |
| 4,998,176 | 3/1991 | Takamae | 360/133 |
| 5,189,585 | 2/1993 | Kubo | 360/133 |

FOREIGN PATENT DOCUMENTS 60-145581  8/1985  Japan.

*Primary Examiner*—Jefferson Evans

[57] ABSTRACT

A hybrid nonwoven liner for a diskete holder is bonded and impregnated with a small amount of binder which is uniformly distributed throughout the fabric and comprises no more than 5% by weight and preferably between 1.5–3.0% by weight of the fabric. The low concentration of binder ensures that the liner surface does not become totally coated with plastic film that reduces cleaning ability, while also providing a high increase in tensile strength and a significant debris reduction. The binder solution preferably has a high surface tension (low surfactant level), so that the binder beads and becomes dried at junction points of the fibers and evenly distributed throughout the fabric. The low level of surfactant ensures a low risk of chemical attack of the disk media surface.

REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1–24 are cancelled.

* * * * *